(12) United States Patent
Anthony

(10) Patent No.: X8404
(45) Date of Patent: Sep. 13, 1834

(54) BEDSTEAD, FOR THE SICK

(76) Inventor: David Anthony

David Anthony, Adams, Massachusetts
Letters Patent

The Schedule referred to in these Letters Patent, and making part of the same, containing a description in the words of the said David Anthony himself, of his improvement in a Bedstead for the use of Invalids, which he denominates the Relief Bedstead.

---

To all whom it may concern, Be it known, that I, David Anthony of Adams, in the County of Berkshire, and State of Massachusetts, have invented a Bedstead for the use of invalids, which I denominate the Relief Bedstead, and I do hereby declare that the following is a full and exact description thereof.

The Bedstead is made in many respects in the usual form of the high or four post bedstead with tester, or frame on the top of the posts. This frame is to have in it the pulleys necessary to raise the patient, and a windlass, to be presently described. A sheet is prepared upon which the patient is to be laid, which sheet is to be stretched out, in such a way that it may be raised with the person upon it, to renew the bed linen, make the bed, and perform such other offices as may be requisite. This sheet is sometimes stretched upon a square frame, passing along each of its edges, which frame passes within the posts of the bedstead. Instead of a frame I sometimes use two rods, which pass along each side of the sheet, being attached to it by suitable means; these rods are somewhat longer than the bedstead as they pass up on the outside of the posts, and are kept apart by their ends bearing against them. The posts in this case, should be without mouldings on their lower ends, against which the rails are to slide; and, to lessen the friction, I put revolving barrels upon the ends of the rods, which operate as rollers; or adopt such other device as may attain the same end. The sheet may then readily be raised with the person on it. When the sheet is strained upon a square frame, the person may be swung backward and forward.

The raising of the person is effected by means of a crank, operating upon a wheel and pinion fixed on one of the posts, usually at the foot. The pinion I have used, is one inch and a half in diameter, and the wheel one foot; the shaft of the wheel upon which the strap or band winds, may also be an inch and a half in diameter. From this

United States Patent

Patent No.: X8404 shaft; a strap, or band, passes up the post, and is connected to the respective cords, four in number, used for raising the sheet. There are four pulleys fixed in the upper rail, two on each side, a foot or eighteen inches within each post. Cords attached to the rods, or frame, upon which the sheet is strained, pass over these pulleys, the two on the same side with the wheel and pinion, directly to the strap, or band before mentioned; and the two on the opposite side of the same strap, conducted thereto round horizontal pulleys. When the crank handle is turned, a person will be very readily raised by the nurse, or other attendant. A ratchet and pall may be added, to keep it in its place.

The sacking bottom is fixed upon two separate frames, each reaching across the bedstead; the upper of these frames is hinged to the side rails of the bedstead in such a way, that it may be raised up in any degree, to support the head and body of the patient. To raise this part, I employ a wheel and axle crossing the upper frame of the bedstead, two feet or more from the foot rail. The axle may be from one to two inches in diameter, and the wheel on its centre, 16 or 18 inches. Cords reach from either end of the axle or shaft, to the upper corners of the last mentioned frame, and an endless band passes round a groove in the wheel and hangs down, so that the patient may raise the head frame, or it may be raised by an assistant. A ratchet and pall upon one end of the axle retains it in its place, when raised.

Should it be desired to give a sitting position to the patient, the lower, sacking frame is so constructed, that it can slide on the side rails, and be passed under the head, or raising frame. The foot rail of the bedstead may be removed, to enable the patient, when well enough, to walk, unobstructed, from the seat so formed. I sometimes also hang the head board upon hinges, so that it may turn back into a horizontal position, and rest upon a trestle, or upon two swinging legs prepared for that purpose. When the foot rail is made to remove, I connect the two side rails by a piece framed across from one to the other, and thus give them the requisite stability.

What I claim as my invention, is, the construction of a bedstead for the use of Invalids, in which the various shifting parts which I have described, or any number of them, are provided & operated upon by the means set forth, or by such as are analogous thereto, and produce a similar result.

Witnesses
Wm. Hamilton
Jn. M. Wilson

David Anthony.

To be made [illegible]

(948 words) [illegible]